US007152132B2

(12) United States Patent
Fike et al.

(10) Patent No.: US 7,152,132 B2
(45) Date of Patent: Dec. 19, 2006

(54) METHOD AND APPARATUS FOR IMPROVING BUFFER UTILIZATION IN COMMUNICATION NETWORKS

(75) Inventors: Melanie A Fike, Austin, TX (US); William J. Wen, Austin, TX (US)

(73) Assignee: Qlogic Corporation, Aliso Viejo, CA (US)

( * ) Notice: Subject to any disclaimer, the term of this patent is extended or adjusted under 35 U.S.C. 154(b) by 160 days.

(21) Appl. No.: 10/889,588

(22) Filed: Jul. 12, 2004

(65) Prior Publication Data

US 2005/0015517 A1 Jan. 20, 2005

Related U.S. Application Data

(60) Provisional application No. 60/492,346, filed on Aug. 4, 2003, provisional application No. 60/490,747, filed on Jul. 29, 2003, provisional application No. 60/487,876, filed on Jul. 16, 2003, provisional application No. 60/487,887, filed on Jul. 16, 2003, provisional application No. 60/487,875, filed on Jul. 16, 2003, provisional application No. 60/487,667, filed on Jul. 16, 2003, provisional application No. 60/487,665, filed on Jul. 16, 2003, provisional application No. 60/487,873, filed on Jul. 16, 2003.

(51) Int. Cl.
*G06F 13/36* (2006.01)
(52) U.S. Cl. ..................... 710/310; 709/225
(58) Field of Classification Search .............. 710/310, 710/20, 7; 709/225; 370/235, 412
See application file for complete search history.

(56) References Cited

U.S. PATENT DOCUMENTS 4,162,375 A    7/1979   Schlichte ................ 179/15

(Continued)

FOREIGN PATENT DOCUMENTS

EP    0649098    9/1994

(Continued)

OTHER PUBLICATIONS

Clark, Tom, "Zoning for Fibre Channel Fabrics", Vixel Corporation Paper—XP002185194., (Aug. 1999), pp. 1-6.

(Continued)

*Primary Examiner*—Rehana Perveen
*Assistant Examiner*—Clifford Knoll
(74) *Attorney, Agent, or Firm*—Klein, O'Neill & Singh, LLP; Tejinder Singh

(57) ABSTRACT

A method and a switch element for buffer utilization in a network are provided. The method includes, receiving plural frames in a first buffer, if the received frames are less than a full size frame and can be accommodated in the first buffer; sending an available buffer signal after the first buffer has been utilized; and receiving a frame after the available buffer signal has been sent. The switch element includes, a port having a state machine that monitors buffer utilization by receiving plural frames in a first buffer. Also, a method for managing a receive queue for a network is provided. The method includes, copying a receive descriptor queue entry from a first location to another location while a processor is performing a critical operation; and freeing the receive queue entry such that the processor can complete the critical operation.

12 Claims, 14 Drawing Sheets

U.S. PATENT DOCUMENTS

| | | | |
|---|---|---|---|
| 4,425,640 A | 1/1984 | Philip et al. ............... 370/58 |
| 4,546,468 A | 10/1985 | Christmas et al. ............ 370/54 |
| 4,569,043 A | 2/1986 | Simmons et al. ............ 370/63 |
| 4,725,835 A | 2/1988 | Schreiner et al. ...... 340/825.83 |
| 4,821,034 A | 4/1989 | Anderson et al. .......... 340/825 |
| 5,144,622 A | 9/1992 | Takiyasu et al. ......... 370/85.13 |
| 5,367,520 A | 11/1994 | Cordell ....................... 370/60 |
| 5,568,614 A | 10/1996 | Mendelson et al. |
| 5,598,541 A | 1/1997 | Malladi ....................... 395/286 |
| 5,610,745 A | 3/1997 | Bennett ....................... 359/139 |
| 5,687,172 A | 11/1997 | Cloonan et al. ............ 370/395 |
| 5,748,612 A | 5/1998 | Stoevhase et al. .......... 370/230 |
| 5,818,842 A | 10/1998 | Burwell et al. ............. 370/397 |
| 5,894,560 A * | 4/1999 | Carmichael et al. ........... 710/25 |
| 5,937,169 A | 8/1999 | Connery et al. |
| 5,987,028 A | 11/1999 | Yang et al. ................. 370/380 |
| 5,999,528 A | 12/1999 | Chow et al. ................. 370/365 |
| 6,014,383 A | 1/2000 | McCarty ..................... 370/453 |
| 6,021,128 A | 2/2000 | Hosoya et al. .............. 370/380 |
| 6,047,323 A | 4/2000 | Krause ....................... 709/227 |
| 6,081,512 A | 6/2000 | Muller et al. ............... 370/256 |
| 6,118,776 A | 9/2000 | Berman |
| 6,128,292 A | 10/2000 | Kim et al. .................. 370/356 |
| 6,144,668 A | 11/2000 | Bass et al. |
| 6,160,813 A | 12/2000 | Banks et al. ................. 370/422 |
| 6,308,220 B1 | 10/2001 | Mathur ....................... 709/238 |
| 6,324,181 B1 | 11/2001 | Wong et al. ................. 370/403 |
| 6,330,236 B1 | 12/2001 | Ofek et al. .................. 370/369 |
| 6,343,324 B1 | 1/2002 | Hubis et al. |
| 6,353,612 B1 | 3/2002 | Zhu et al. |
| 6,370,605 B1 | 4/2002 | Chong |
| 6,411,599 B1 | 6/2002 | Blanc et al. ................. 370/219 |
| 6,424,658 B1 | 7/2002 | Mathur ....................... 370/429 |
| 6,449,274 B1 | 9/2002 | Holden et al. .............. 370/392 |
| 6,457,090 B1 | 9/2002 | Young |
| 6,467,008 B1 | 10/2002 | Gentry, Jr. et al. ......... 710/261 |
| 6,597,691 B1 | 7/2003 | Anderson et al. ........... 370/360 |
| 6,597,777 B1 | 7/2003 | Ho |
| 6,697,359 B1 | 2/2004 | George ....................... 370/357 |
| 6,760,302 B1 | 7/2004 | Ellinas et al. |
| 6,886,141 B1 | 4/2005 | Kunz et al. |
| 2001/0038628 A1 | 11/2001 | Ofek et al. .................. 370/392 |
| 2002/0034178 A1 | 3/2002 | Schmidt et al. |
| 2002/0196773 A1 | 12/2002 | Berman |
| 2003/0016683 A1 | 1/2003 | George et al. |
| 2003/0056000 A1 | 3/2003 | Mullendore et al. |
| 2003/0091062 A1 | 5/2003 | Lay et al. |
| 2003/0120983 A1 | 6/2003 | Vieregge et al. |
| 2003/0126320 A1 | 7/2003 | Liu et al. |
| 2003/0179748 A1 | 9/2003 | George et al. ............. 370/389 |
| 2003/0189935 A1 | 10/2003 | Warden et al. |
| 2003/0236953 A1 | 12/2003 | Grieff et al. |
| 2004/0013092 A1 | 1/2004 | Betker et al. |
| 2004/0013125 A1 | 1/2004 | Betker et al. |
| 2004/0028038 A1 | 2/2004 | Anderson et al. |
| 2004/0141521 A1 | 7/2004 | George ....................... 370/463 |

FOREIGN PATENT DOCUMENTS

| | | |
|---|---|---|
| EP | 0856969 | 1/1998 |
| WO | WO-98/36537 | 8/1998 |

OTHER PUBLICATIONS

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, " Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

Curtis, A. R., "Design Considerations for 10-Gbit Fibre Channel", *Curtis A. Ridgeway, Distinguished I/O Architect, Storage and Computing ASIC's Division, LSI Logic Corp.*.

Malavalli, Kumar , "High Speed Fibre Channel Switching Fabric Devices", *Proceedings of the SPIE, SPIE, Bellingham, VA, USA vol. 1577*, XP0005862869, ISSN: 0277-786X,(Sep. 4, 1991),216-226.

Melhem, et al., "Minimizing Wavelength Conversions in WDM Path Establishment", *Computer Science Department, University of Pittsburgh, Pittsburgh, PA 15260*, (2001),197-211.

Ridgeway, Curt , "0GFC-40GFC using 4-lane XAUI's", *LSI Logic Presentation—T11/03-069v0*.

\* cited by examiner

Frame Manager Block Diagram

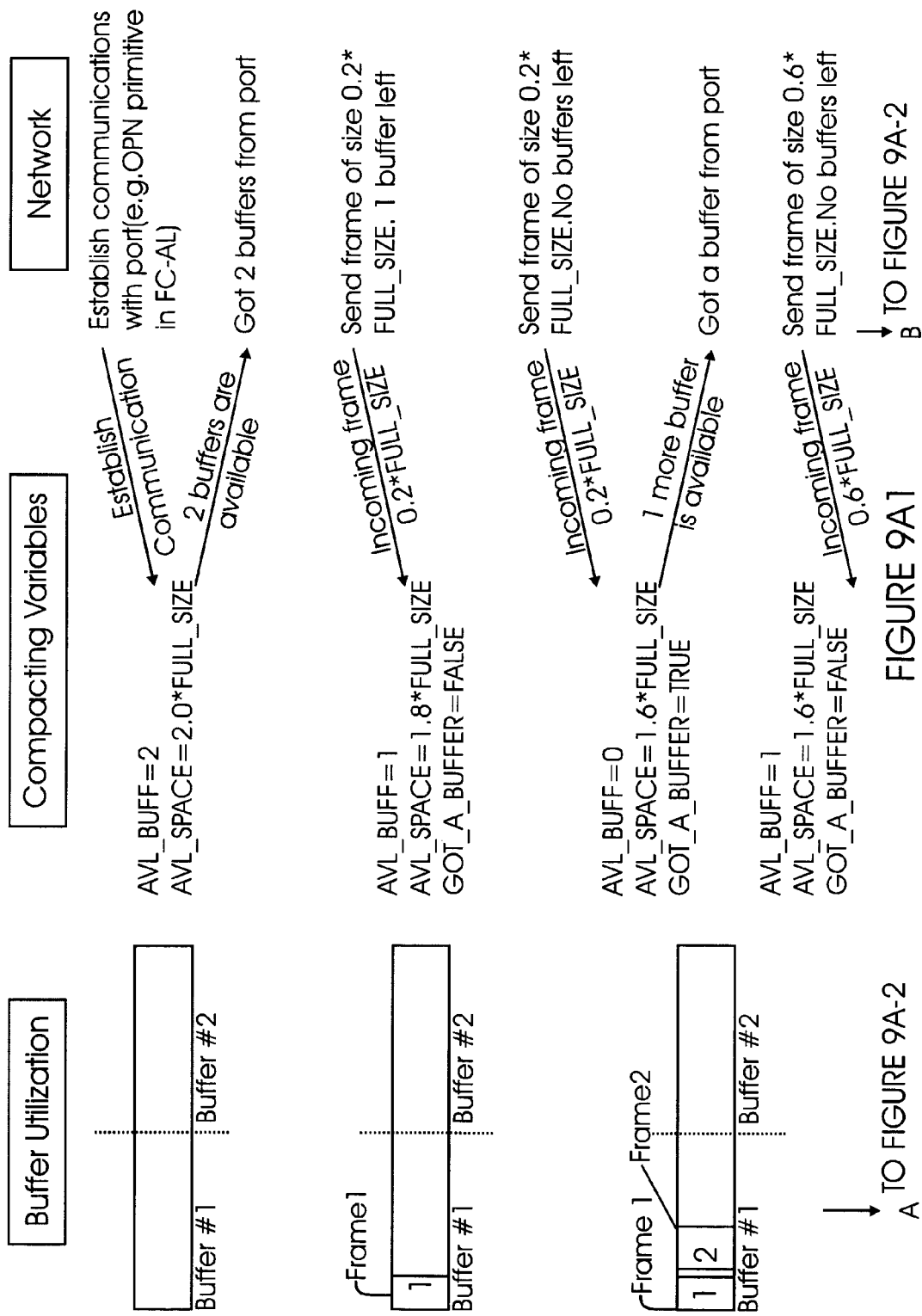
FIGURE 9A1

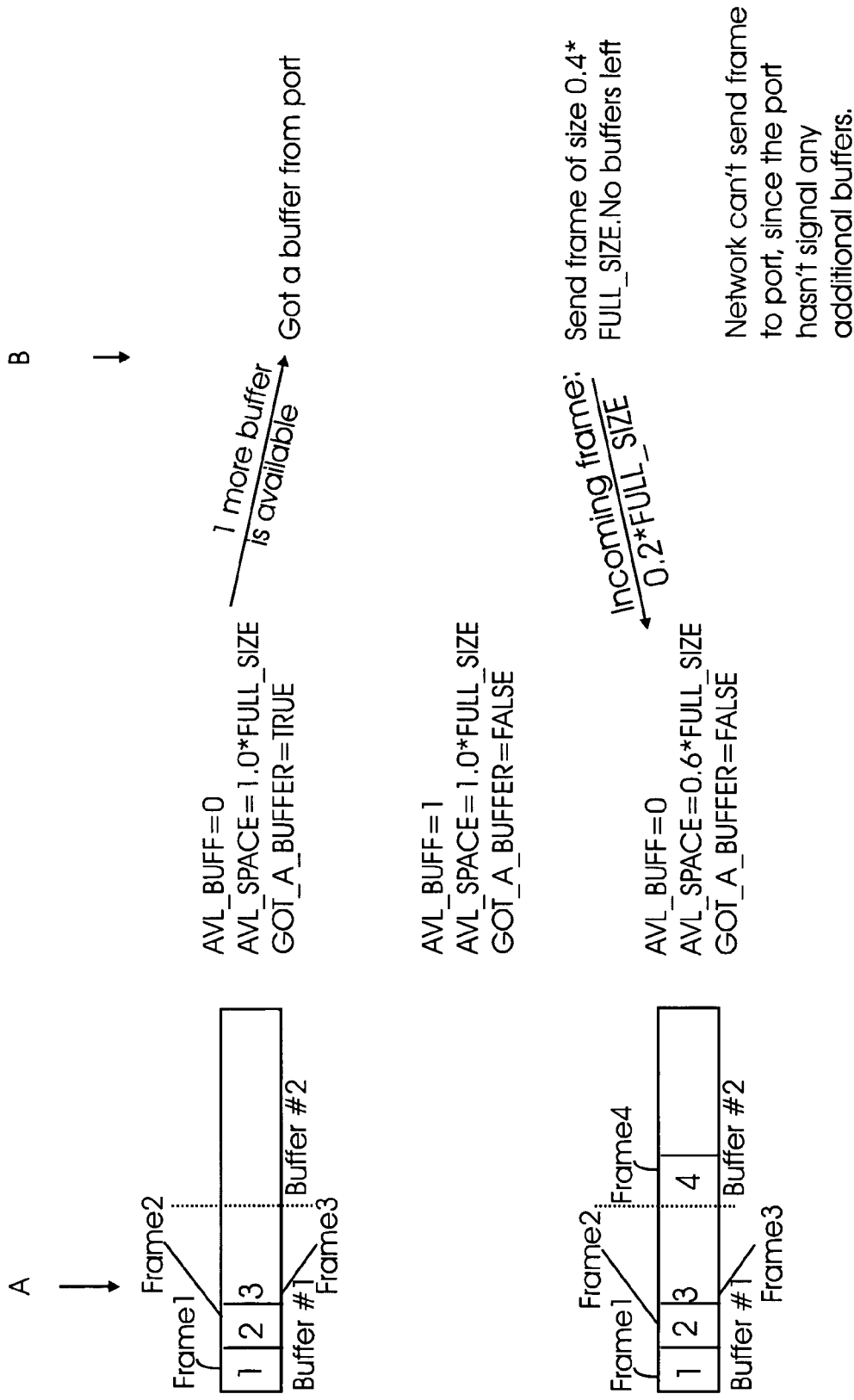
FIGURE 9A2

METHOD AND APPARATUS FOR IMPROVING BUFFER UTILIZATION IN COMMUNICATION NETWORKS

CROSS-REFERENCE TO RELATED APPLICATIONS

This application claims priority under 35 USC Section 119(e), to the following provisional patent applications:
Ser. No. 60/487,876 filed on Jul. 16, 2003;
Ser. No. 60/487,887 filed on Jul. 16, 2003;
Ser. No. 60/487,875 filed on Jul. 16, 2003;
Ser. No. 60/490,747 filed on Jul. 29, 2003;
Ser. No. 60/487,667 filed on Jul. 16, 2003;
Ser. No. 60/487,665 filed on Jul. 16, 2003;
Ser. No. 60/492,346 filed on Aug. 4, 2003; and
Ser. No. 60/487,873 filed on Jul. 16, 2003.

The disclosures of the foregoing applications are incorporated herein by reference in their entirety.

BACKGROUND

1. Field of the Invention

The present invention relates to networks, and more particularly to improving buffer utilization in communication networks using non-negotiated content block sizes.

2. Background of the Invention

In various communications networks, the endpoints establish data pacing (i.e., data receiving/transferring from one network node to another) through variable number of content-blocks, but the size of each content-block (or data packet/frame size) is fixed. While each content-block during transfer may vary in size, data pacing is performed using content-blocks of a fixed size, and is not negotiated between endpoints (or ports/devices). Fibre Channel is one such environment that uses fixed size content blocks and is briefly described below.

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

In fibre channel, a device (e.g. device A) seeking access to another device (device B) sends an OPN primitive (after it wins arbitration) and establishes a connection with device B. Device B sends an R_RDY primitive indicating that credit is available for a frame. Thereafter, frames are transferred.

In fibre channel, data pacing is established by the R_RDY primitive, which informs the network that a network port has buffer space to receive an additional, full-sized frame. In Fibre Channel, a full-sized frame is typically, 2140 bytes, excluding Start-of-Frame and End-of-Frame primitives. Because the size of these content-blocks (or frames) in such a network is not negotiable for data pacing, buffer utilization is very poor.

In networks (for example, fibre channel) where data pacing utilizes non-negotiated size for content-blocks, traditional implementation of network ports keep a one-to-one relationship between content and the buffer. FIG. 2 shows a port with two 2 unused buffers, each of FULL_SIZE (if the maximum content size is defined as FULL_SIZE) to store a fixed size content block. FIG. 2 also shows two receive descriptor queues that store descriptors that describe content block size/type and/or location.

FIG. 3A shows a conventional implementation in a network port receiving two content-blocks where each block is placed in its own buffer. For example, Block #1 is placed in Buffer #1 and Block #2 is placed in Buffer #2. Until the content-blocks in the buffers are processed, the network port cannot receive additional content-blocks, although there may be enough free buffer space (FIG. 3A). The smaller the content-block relative to the buffer size, the poorer the buffer utilization.

As a network port receives a content-block, it adds a descriptor entry into the receive queue (FIG. 2). The descriptor entry includes information about where the content-block resides in the buffer space, and the length of the content block, etc. Since the receive queue is implemented in hardware, the maximum number of entries in a receive queue is fixed for a specific device. A receive queue with a fixed number of entries also limits buffer utilization.

FIG. 3B shows process steps in conventional techniques resulting in poor buffer utilization. For example, suppose a network port has 2 FULL_SIZE buffers available and 16 available entries in the receive queue, if the average size of content-blocks is less than the FULL_SIZE/16, the size of the receive queue limits buffer utilization, even after compacting content-blocks into the buffers.

Typically, a state-machine or a general-purpose central processing unit ("CPU") via firmware processes frames. If the state machine/CPU has more time-critical tasks, processing of incoming frames would be delayed, and buffer utilization would suffer if the receive descriptor queue fills up before the buffers, as stated above.

Therefore, what is required is a process and system that allows dynamic content block compacting with dynamic sizing of the receive queue.

SUMMARY OF THE INVENTION

In one aspect of the present invention, a method for buffer utilization in a network is provided. The method includes, receiving plural frames in a first buffer, if the received frames are less than a full size frame and can be accommodated in the first buffer; sending an available buffer signal after the first buffer has been utilized; and receiving a frame after the available buffer signal has been sent. A state machine monitors buffer utilization and sends the available buffer signal.

In yet another aspect of the present invention, a fibre channel switch element is provided. The switch element includes, a port having a state machine that monitors buffer utilization by receiving plural frames in a first buffer, if the received frames are less than a full size frame and can be accommodated in the first buffer; sending an available buffer signal after the first buffer has been utilized; and receiving a frame after the available buffer signal has been sent.

In yet another aspect of the present invention, a method for managing a receive queue for a network is provided. The method includes, copying a receive descriptor queue entry from a first location to another location while a processor is performing a critical operation; and freeing the receive queue entry such that the processor can complete the critical operation.

In yet another aspect of the present invention, a fibre channel switch element is provided. The switch element includes, a port having a state machine for copying a receive descriptor queue entry from a first location to another location while a processor is performing a critical operation; and freeing the receive queue entry such that the processor can complete the critical operation.

In one aspect of the present invention, by copying and then freeing the descriptor entries from the Receive Queue during timing-critical processing, the Frame-Processor can dynamically size the Receive Queue and maximize buffer utilization. The descriptor entries are copied to a secondary storage. If the Frame-Processor is a CPU running firmware, the descriptor entries may be copied to any memory that is accessible to a processor.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 9A1–9A2 (jointly referred to as FIG. 9) show an example of using the state machines, according to one aspect of the present invention;

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"AL_PA": Arbitrated loop physical address.

"AVL_BUFF": A variable to keep track of the number of available buffers.

"AVL_SPACE": Size of available buffer space, in the same units as "FULL_SIZE".

"Content Block": A data block (or frame) copied from the network into a buffer space.

"Data Pacing": The rate at which data is received/transferred.

"FC-AL": Fibre channel arbitrated loop process described in FC-AL standard.

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"FULL_SIZE": Maximum size of a content-block. In networks where the size is fixed by standard (e.g. Fibre Channel), this value is a constant used for various calculations.

"LIP": Loop initialization protocol primitive.

"L_Port": A port that contains Arbitrated Loop functions associated with the Arbitrated Loop topology.

"REQ_FREE": A requests from a processor to free buffer space.

"SES": SCSI Enclosure Services.

"TPE": Transmission Protocol Engine, a controller that operates at the FC-1 level.

To facilitate an understanding of the preferred embodiment, the general architecture and operation of a fibre channel system will be described. The specific architecture and operation of the preferred embodiment will then be described with reference to the general architecture of the fibre channel system.

Figure 1:
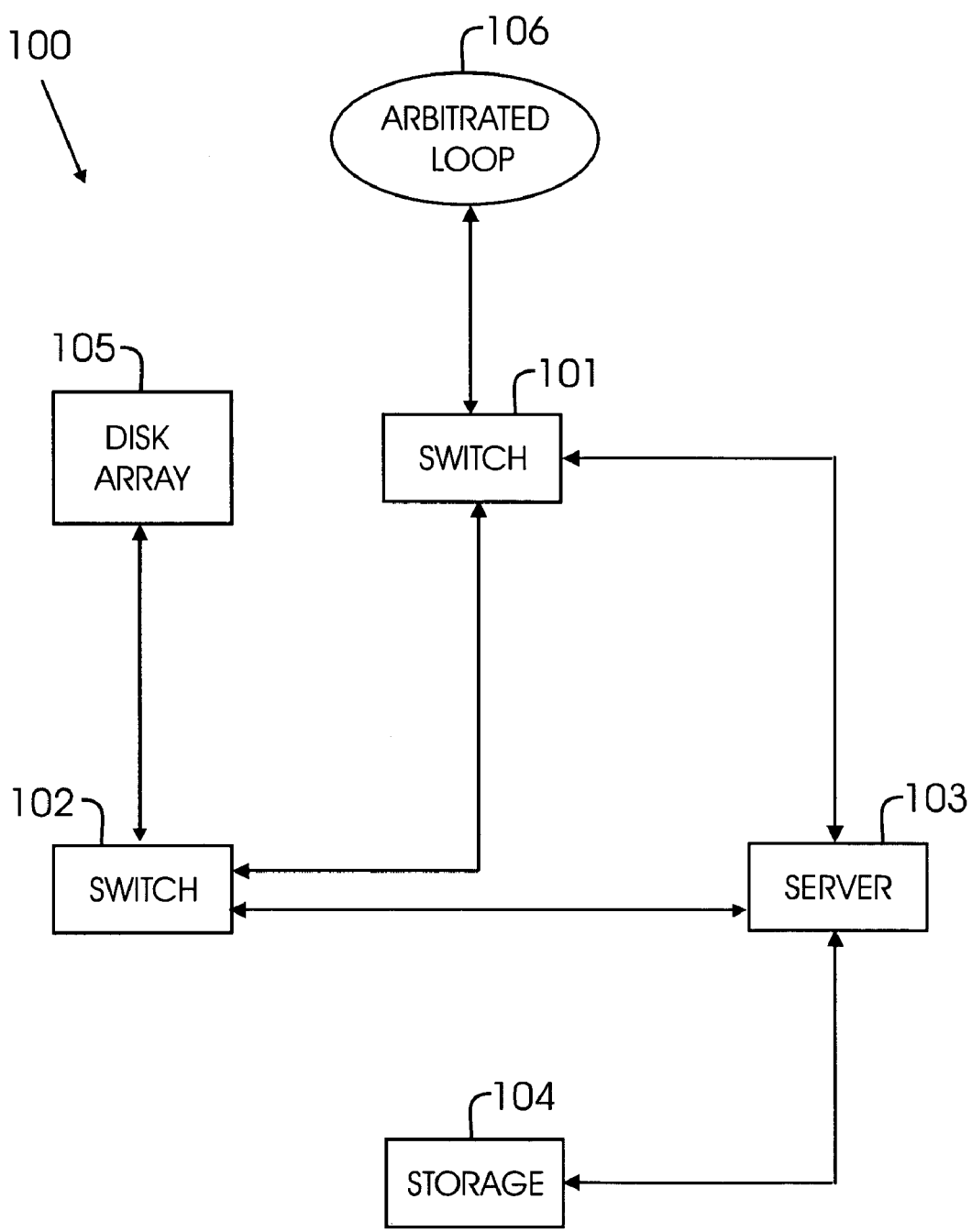
FIG. 1 shows a block diagram of a storage area network.
Figure 2:
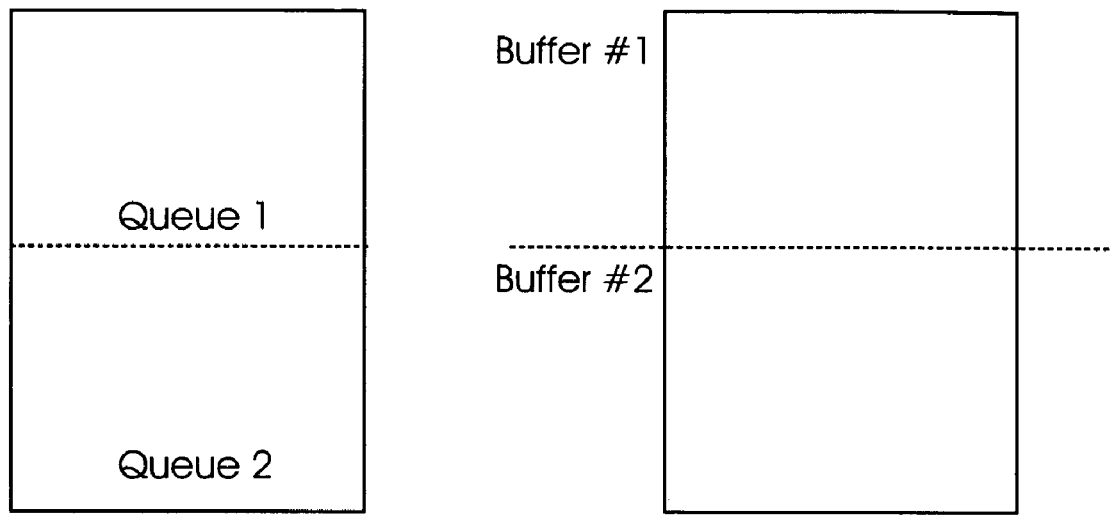
FIG. 2 shows a receive descriptor queue and available buffers for storing content blocks.
Figure 3A:
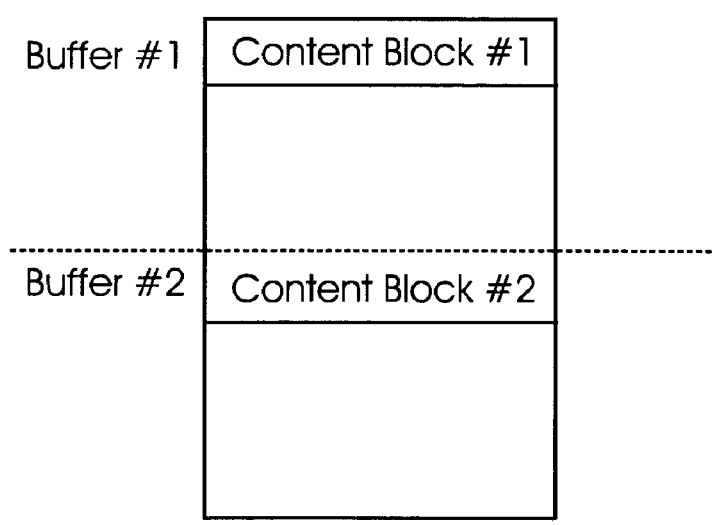
FIG. 3A shows how a content block of a fixed size is placed in a buffer.
Figure 3B:
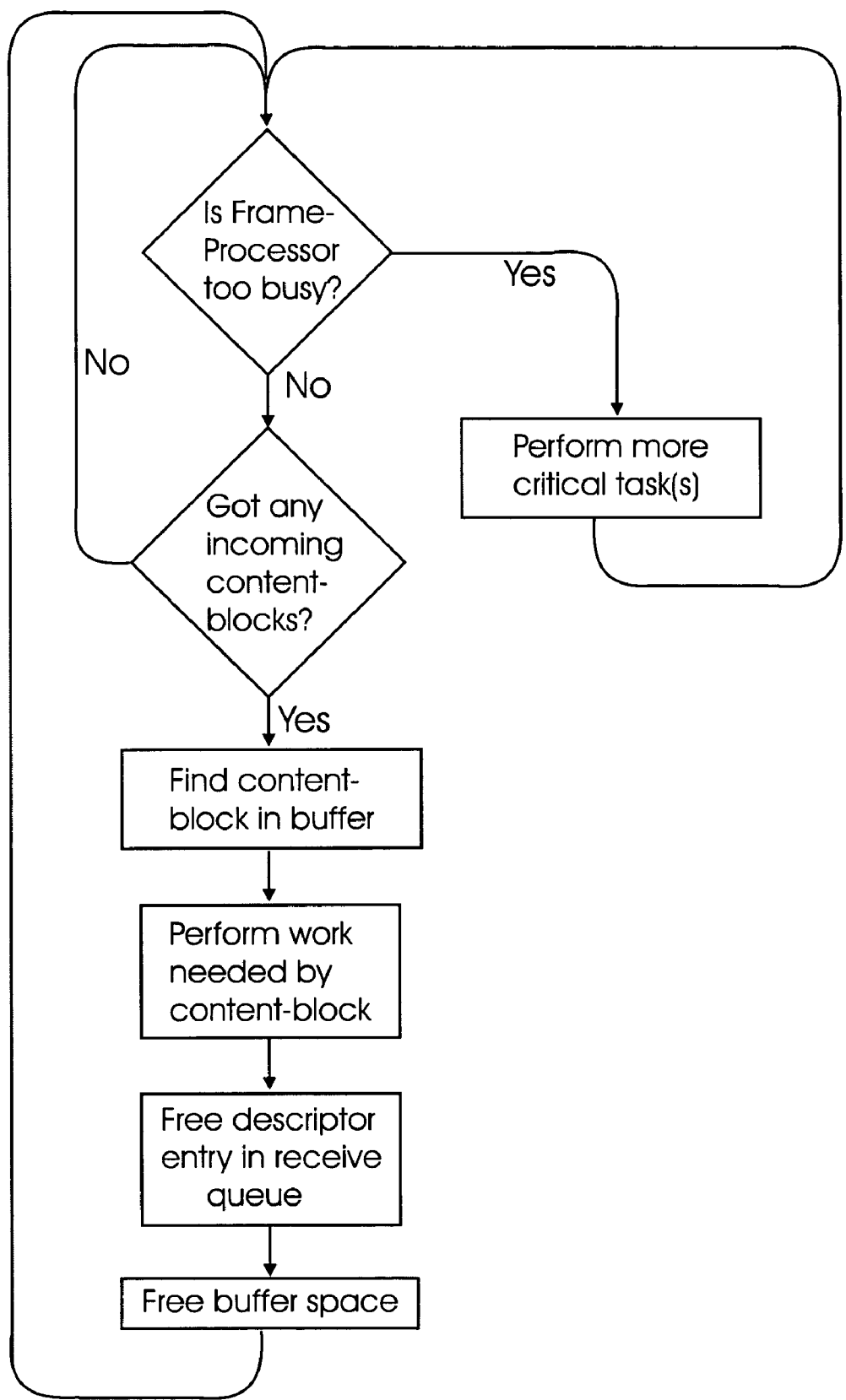
FIG. 3B shows a process flow diagram for processing content blocks in prior art systems.

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1 are operationally coupled via "links" or "paths". A path may be established between two N_ports, e.g. between server 103 and storage 104. A packetswitched path may be established using multiple links, e.g. an N-Port in server 103 may establish a path with disk array 105 through switch 102.

Figure 4:
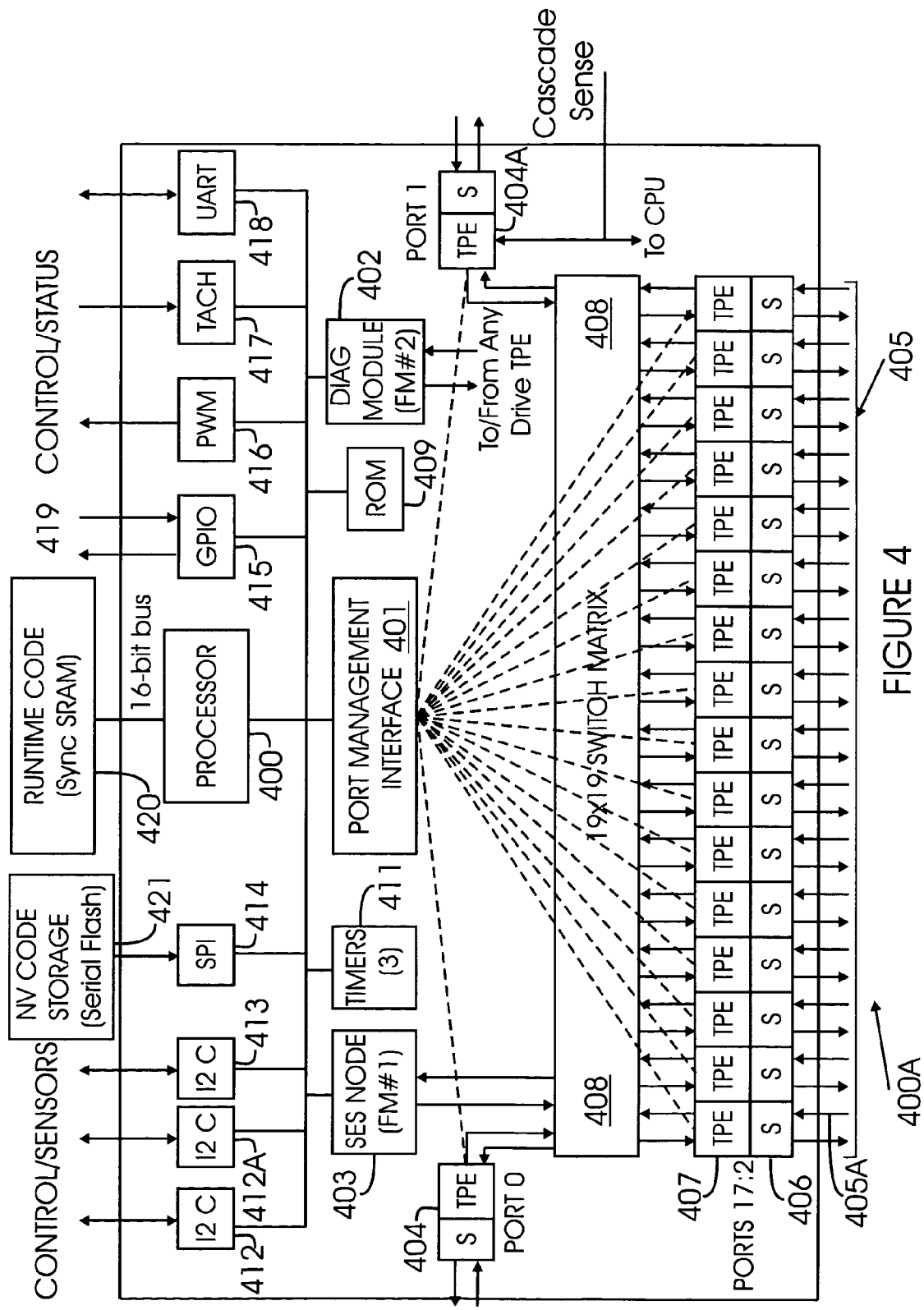
FIG. 4 shows a block diagram of a switch element, according to one aspect of the present invention.

FIG. 4 is a block diagram of an 18-port ASIC FC element 400A (also referred to as system 400A) according to one aspect of the present invention. FC element 400A provides various functionality in an FC-AL environment, including without limitation, FC element 400A operates as a loop controller and loop switch using switch matrix 408, in accordance with the FC-AL standard.

FC element 400A of the present invention is presently implemented as a single CMOS ASIC, and for this reason the term "FC element" and ASIC are used interchangeably to refer to the preferred embodiments in this specification. Although FIG. 4 shows 18 ports, the present invention is not limited to any particular number of ports.

System 400A provides a set of port control functions, status indications, and statistics counters for monitoring the health of the loop and attached devices, diagnosing faults, and recovering from errors.

ASIC 400A has 18 ports where 16 ports are shown as numeral 405 while a host port 404 and cascade port 404A are shown separately for convenience only. These ports are generic to common Fibre Channel port types, for example, L_Ports.

For illustration purposes only, all ports are drawn on the same side of ASIC 400A in FIG. 4. However, the ports may be located on any side of ASIC 400A. This does not imply any difference in port or ASIC design. Actual physical layout of the ports will depend on the physical layout of the ASIC.

Each port has transmit and receive connections to switch matrix 408 and includes transmit protocol engine 407 and a serial/deserializer 406. Frames enter/leave the link 405A and SERDES 406 converts data into 10-bit parallel data to fibre channel characters.

Switch matrix 408 dynamically establishes a connection for loop traffic. Switch matrix 408 includes a global arbiter (hence switch matrix 408 is also referred to as SGA 408) that provides lower latency and improved diagnostic capabilities while maintaining full Fibre Channel Arbitrated Loop (FC-AL) compliance.

Switch matrix 408 provides a quasi-direct architecture in the form of a buffer-less Switch Matrix. Switch matrix 408 includes data multiplexers that provide a path to each port.

SGA 408 creates a direct loop connection between source and destination devices. This connection methodology avoids the delay associated with data having to pass from one disk drive member of the loop to the next until the data has completed traversing the loop.

System 400A includes plural I2C (I2C standard compliant) interfaces 412–413 that allow system 400A to couple to plural I2C ports each having a master and slave capability. System 400A uses timer module 411 to control the timing of various operations.

System 400A also includes a general-purpose input/output interface ("GPIO") 415. This allows information from system 400A to be analyzed by any device that can use GPIO 415. Control/Status information 419 can be sent or received through module 415.

System 400A also includes a SPI module 414 that is used for parallel to serial and serial to parallel transfer between processor 400 firmware and flash memory 421 in the standard Little Endian format.

System 400A also includes a Universal Asynchronous Receiver/Transmitter ("UART") interface 418 that converts serial data to parallel data (for example, from a peripheral device modem or data set) and vice-versa (data received from processor 400) complying industry standard requirements.

System 400A can also process tachometer inputs (received from a fan, not shown) using module 417. Processor 400 can read the tachometer input via a tachometer rate register and status register (not shown).

System 400A provides pulse width modulator ("PWM") outputs via module 416. Processor 400 can program plural outputs.

System 400A also includes two frame manager modules 402 and 403 that are similar in structure. Processor 400 can set both modules 402 and 403 into a data capture mode by using a control bit. Processor 400 can access runtime code from memory 420 and input/output instructions from read only memory 409.

Figure 5A:
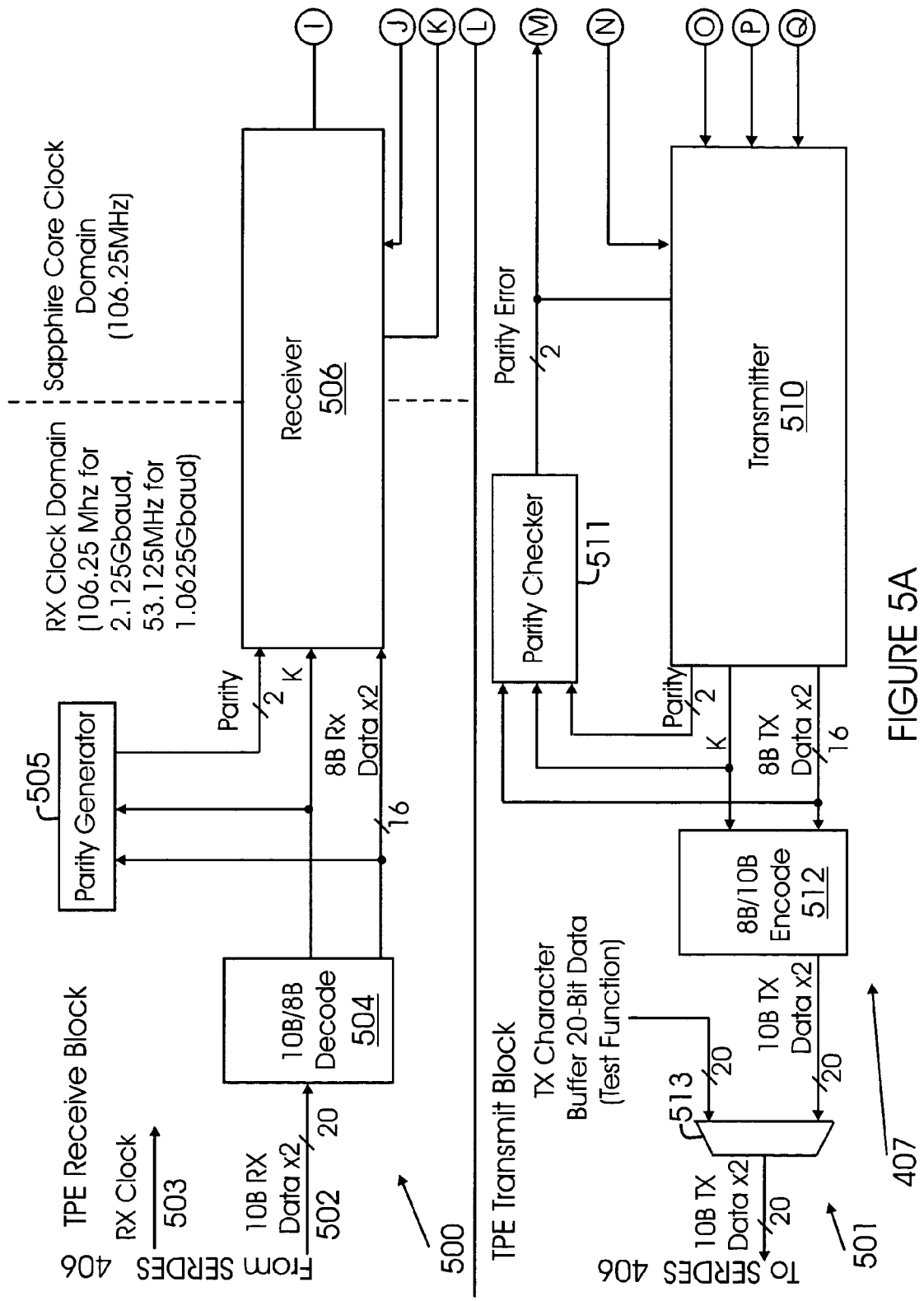
FIGS. 5A and 5B (jointly referred to as FIG. 5) show a block diagram of a transmission protocol engine, according to one aspect of the present invention.
Figure 5B:
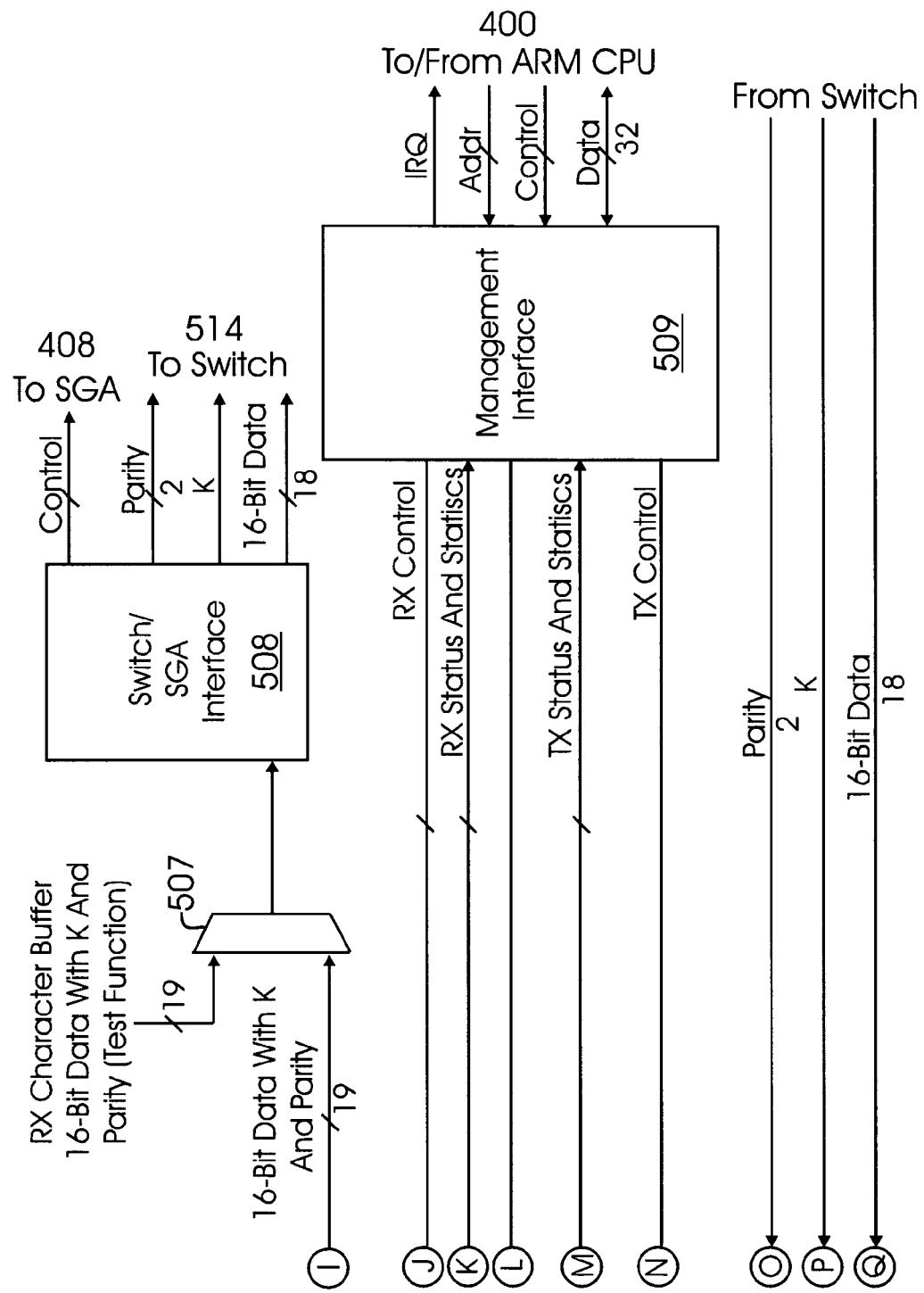

Port Management Interface (PMIF) 401 allows processor 400 access to various port level registers, SerDes modules 406 and TPE Management Interfaces 509 (FIG. 5). PMIF 401 contains a set of global control and status registers, receive and transmit test buffers, and three Serial Control Interface (SCIF) controllers (not shown) for accessing SerDes 406 registers.

Module 402 (also referred to as the "diag module 402") is a diagnostic module used to transfer diagnostic information between a FC-AL and the firmware of system 400A.

Diag module 402 is functionally coupled to storage media (via ports 405) via dedicated paths outside switch matrix 408 so that its connection does not disrupt the overall loop. Diag module 402 is used for AL_PA capture during LIP propagation, drive(s) (coupled to ports 405) diagnostics and frame capture.

Module 403 (also referred to as "SES module 403") complies with the SES standard and is functionally coupled to host port 404 and its output is routed through switch matrix 408. SES module 403 is used for in-band management services using the standard SES protocol.

When not bypassed, modules 402 and 403 receive primitives, primitive sequences, and frames. Based on the received traffic and the requests from firmware, modules 402 and 403 maintain loop port state machine (LPSM) (615, FIG. 6B) in the correct state per the FC-AL standard specification, and also maintains the current fill word.

Based on a current LPSM 615 state (OPEN or OPENED State), modules 402 and 403 receive frames, pass the frame onto a buffer, and alert firmware that a frame has been received. Module 402 and 403 follow FC-AL buffer-to-buffer credit requirements.

Firmware may request modules 402 and 403 to automatically append SOF and EOF to the outgoing frame, and to automatically calculate the outgoing frame's CRC using CRC generator 612. Modules 402 and 403 can receive any class of frames and firmware may request to send either fibre channel Class 2 or Class 3 frames.

Figure 6A:
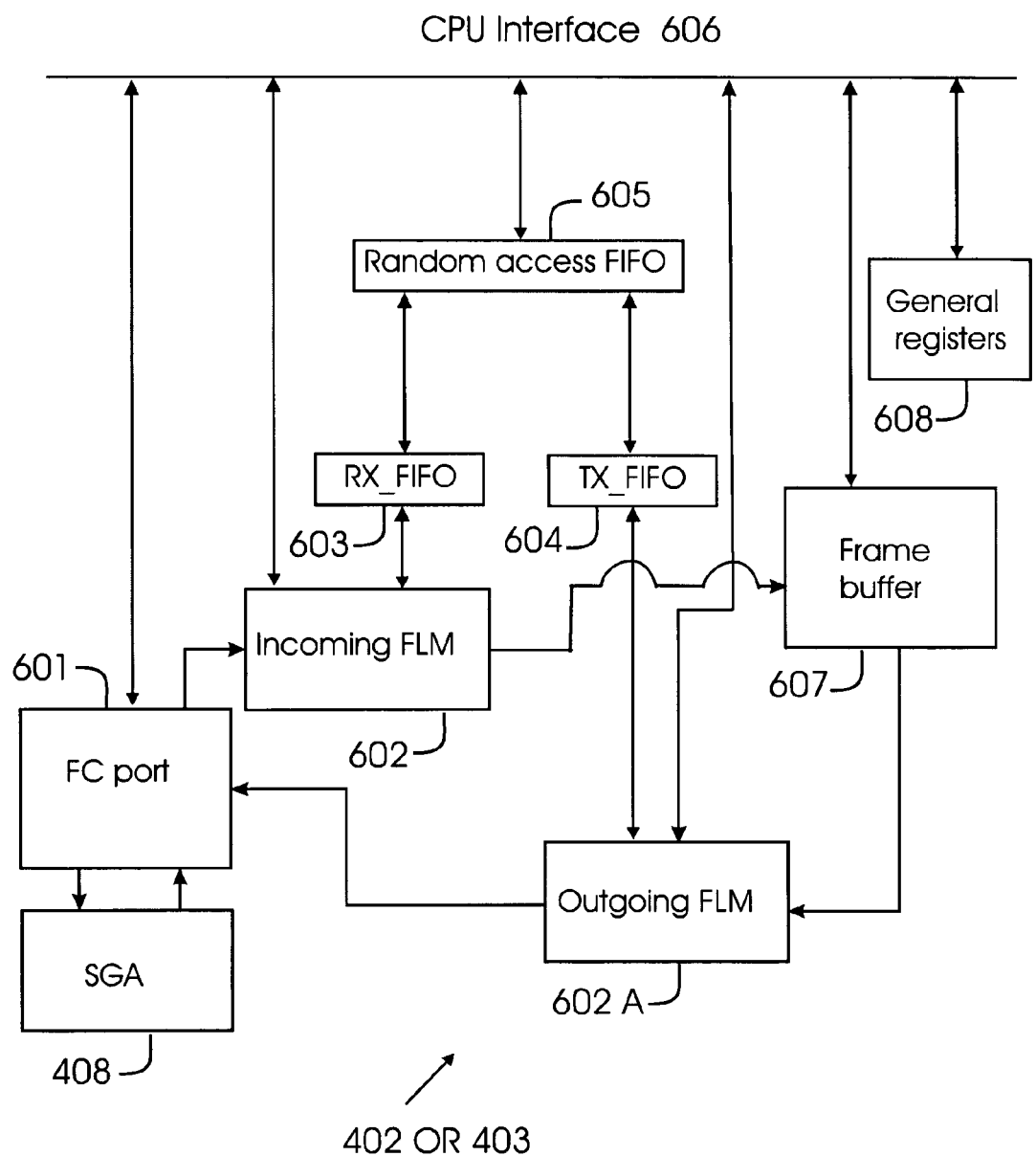
FIGS. 6A and 6B show block diagrams for a diagnostic module and a SES module, according to one aspect of the present invention.
Figure 6B:
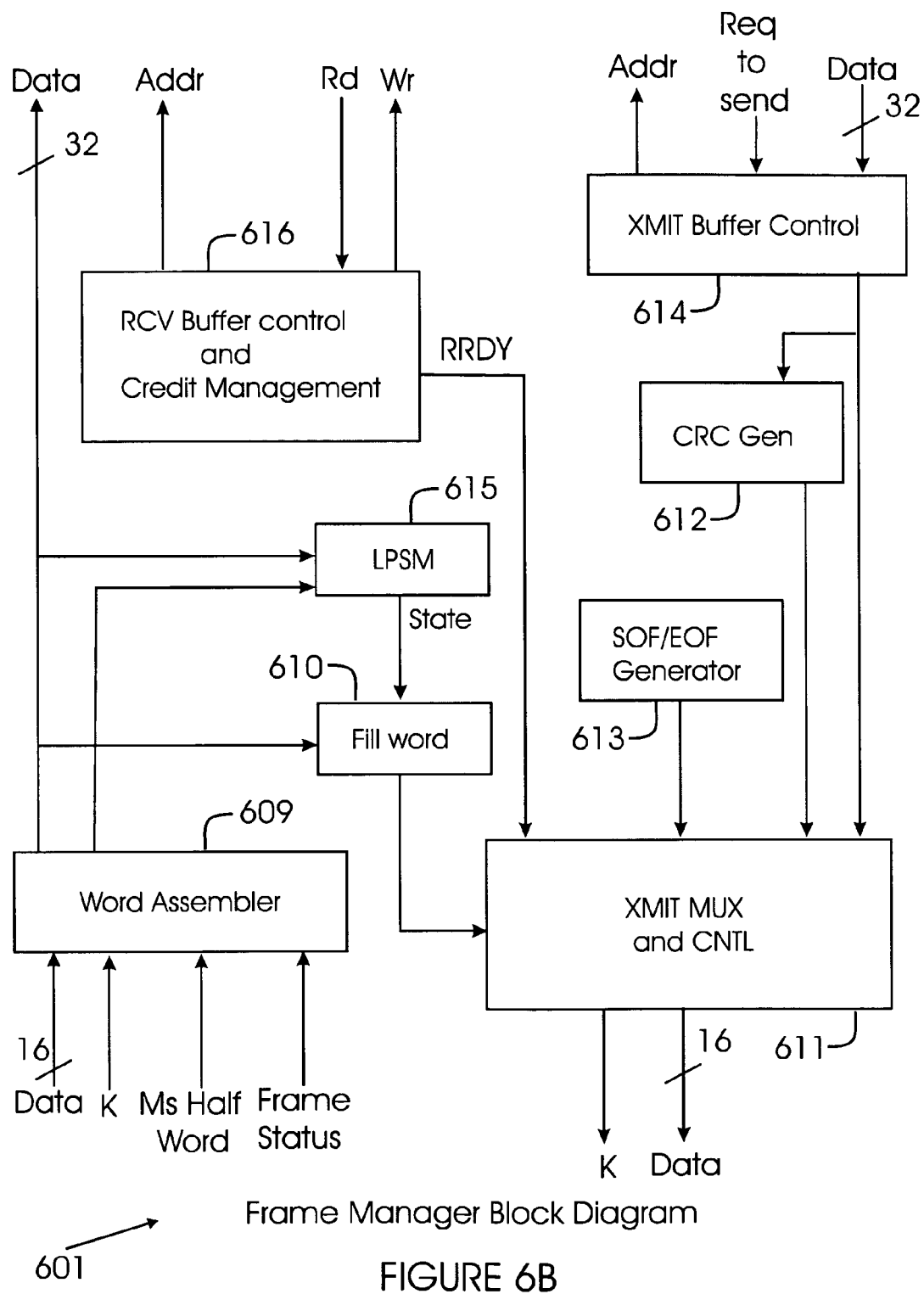

FIGS. 6A and 6B show block diagrams for module 402 and 403. It is noteworthy that the structure in FIGS. 6A and 6B can be used for both modules 402 and 403. FIG. 6B is the internal data path of a FC port 601 coupled to modules 402/403.

Modules 402 and 403 interface with processor 400 via an interface 606. Incoming frames to modules 402 and 403 are received from port 601 (which could be any of the ports 404, 404A and 405) and stored in frame buffer 607. Outgoing frames are also stored in frame buffer 607. Modules 402 and 403 have a receive side memory buffer based on "first-in, first-out" principle, RX_FIFO ("FIFO") 603 and TX_FIFO transmit side FIFO 604 interfacing with FIFO 605. A receive side FIFO 603 signals to firmware when incoming frame(s) are received. A transmit side FIFO 604 signals to hardware when outgoing frames(s) are ready for transmission. A frame buffer 607 is used to stage outgoing frames and to store incoming frames. Modules 602 and 602A are used to manage frame traffic from port 601 to buffers 603 and 604, respectively.

Modules 402 and 403 use various general-purpose registers 608 for managing control, status and timing information.

Based on the AL_PA, modules 402 and 403 monitor received frames and if a frame is received for a particular module (402 or 403), it will pass the frame onto a receive buffer and alert the firmware that a frame has been received via a receive side FIFO 603. Modules 402 and 403 follow the FC-AL buffer-to-buffer credit requirements using module 616. Modules 402 and 403 transmit primitives and frames based on FC-AL rules. On request, modules 402 and 403 may automatically generate SOF and EOF during frame transmission (using module 613). On request, modules 402 and 403 may also automatically calculate the Cyclic Redundancy Code (CRC) during frame transmission, using module 612.

Overall transmission control is performed by module 611 that receives data, SOF, EOF and CRC. Transmit buffer control is performed by module 614. A word assembler module 609 is used to assemble incoming words, and a fill word module 610 receives data "words" before sending it to module 611 for transmission.

Modules 402 and/or 403 can improve buffer utilization by compacting content-blocks into buffers. In addition, since data pacing is based on a non-negotiated size for the content-block, compacting is performed without impacting network-specific data pacing.

Figure 7:
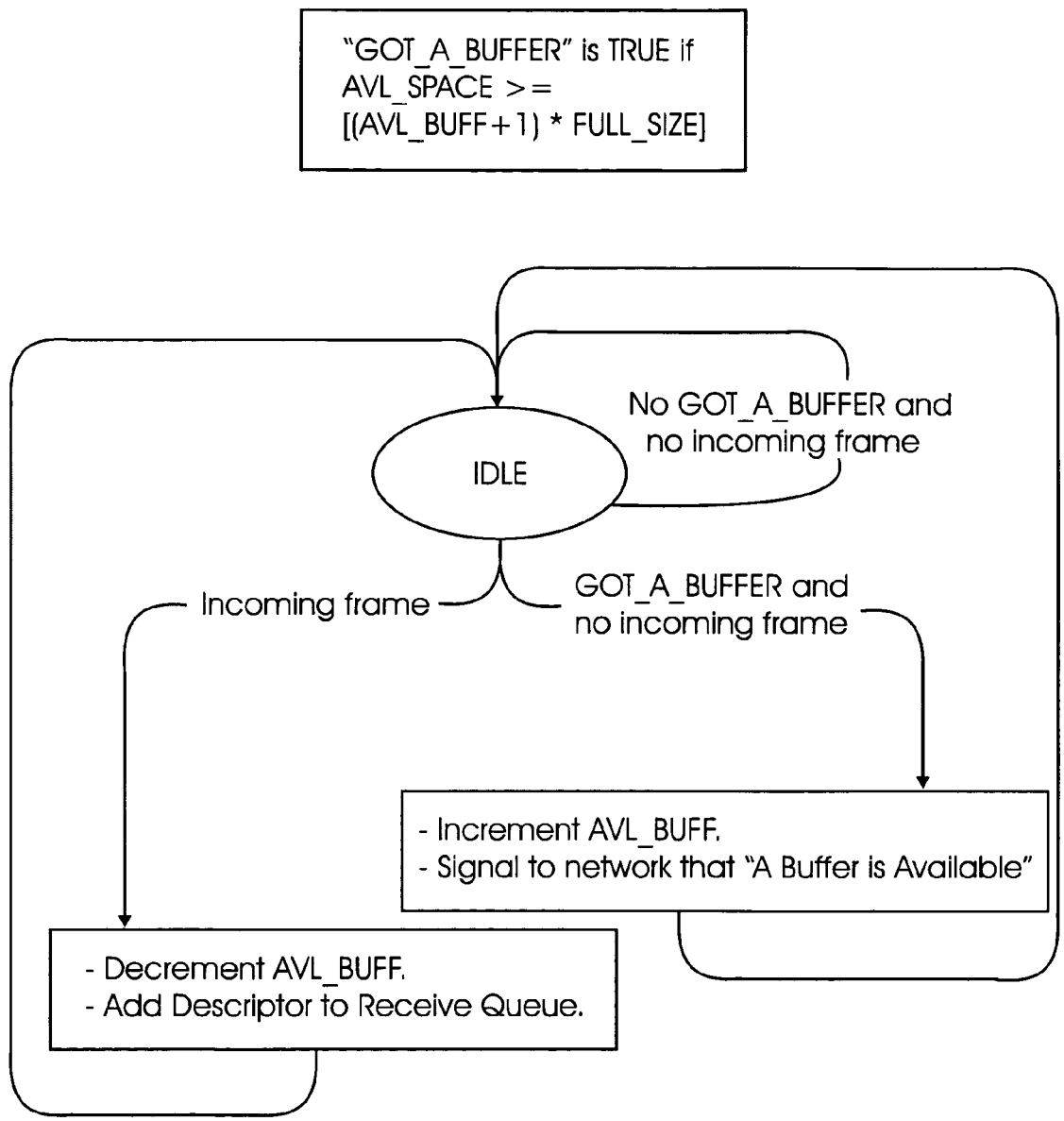
FIGS. 7 and 8 show state machine diagrams, according to one aspect of the present invention.

Modules 402/403 maintain two state machines for improving buffer utilization. One is called an "AVL_BUFF" state machine that maintains data pacing with respect to the network. FIG. 7 shows the state machine diagram for the AVL_BUFF state machine.

Figure 8:
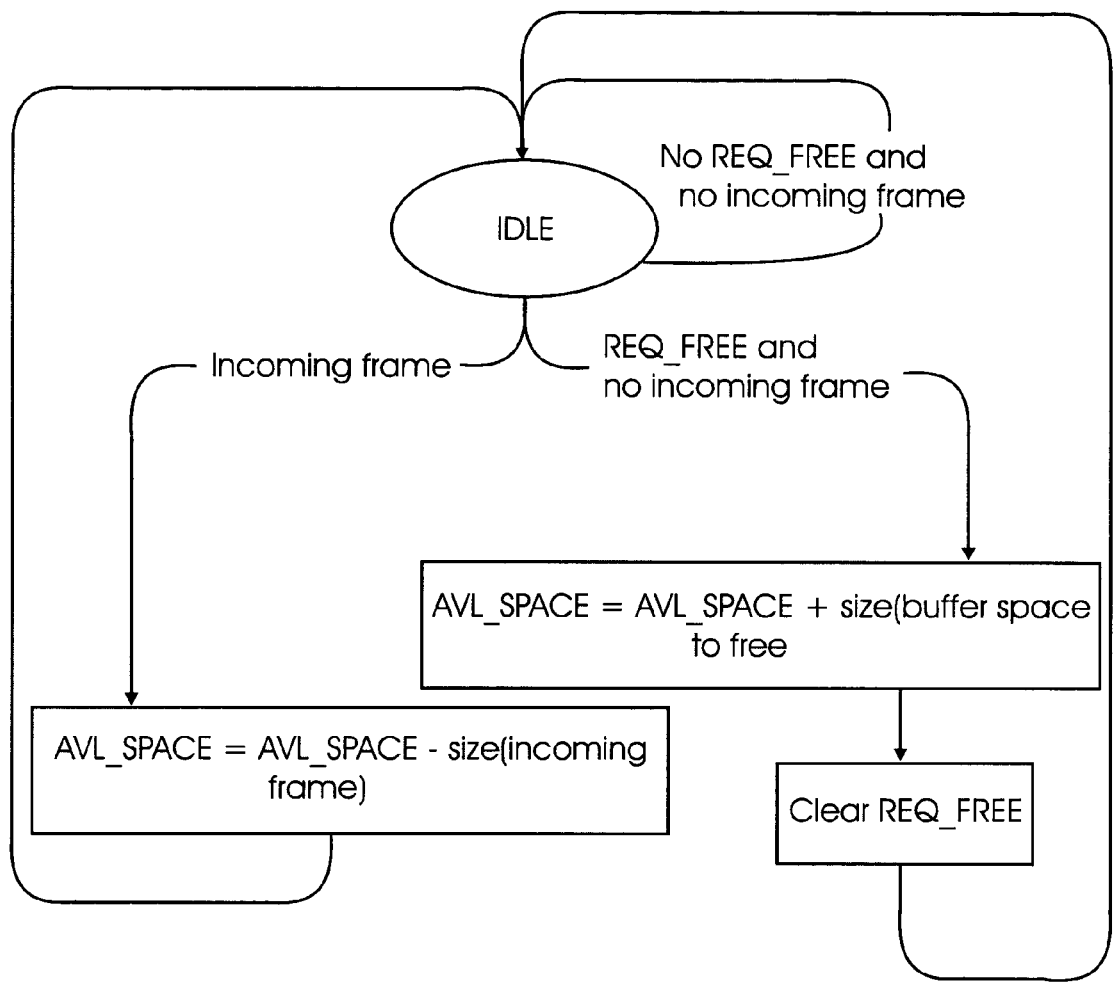

The second state machine is called "AVL_SPACE" state machine and performs buffer space management and content block compacting. FIG. 8 shows a state machine diagram for AVL_SPACE state machine. The REQ_FREE signal is registered when there's a request to free buffer space. AVL_SPACE State Machine clears REQ_FREE signal to resolve priority during simultaneous requests to allocate and free buffer space.

FIG. 9A illustrates how the aforementioned State Machines of FIGS. 7 and 8 operate. As an example, a network port initially has enough buffer space to receive 2 FULL_SIZE content-blocks. It is noteworthy that the present invention is not limited to 2 FULL_SIZE buffers.

Before establishing communications, the network port has 2 FULL_SIZE buffers that are empty and available. When a network connection is established, the port indicates that it has 2 buffers available. Since this type of network (for example, fibre channel) does not allow negotiation of buffer sizes, each available buffer must be FULL_SIZE.

Assume that the network (from another port or device) has a frame to send to the port and the size of the frame is 20% of the FULL_SIZE. It is noteworthy that for data pacing, the network always tracks buffer usage in FULL_SIZE buffers.

After the network sends a frame to the port, only 1 buffer remains available. When the first frame is received, the port adds a descriptor entry into the receive queue, decrements AVL_BUFF, and updates AVL_SPACE to be 1.8*FULL_SIZE (subtracting size of the content-block from AVL_SPACE). Since GOT_A_BUFFER is FALSE, the port does not tell the network that "1 more buffer is available".

The network then sends another frame; and the size of the second frame is also 20% of FULL_SIZE. Because the network tracks buffer availability, the network will hold off sending any more frames to the port, since no buffers are available at this port.

When the port receives the second frame, it adds a descriptor entry into receive queue, decrements AVL_BUFF, and updates AVL_SPACE to 1.6*FULL_SIZE. But now GOT_A_BUFFER is TRUE, since 1.6*FULL_SIZE>=(0+1)*FULL_SIZE. So the port signals that "1 more buffer is available", and increments AVL_BUFF. The updated AVL_BUFF causes GOT_A_BUFFER to be FALSE.

When the network gets another buffer available signal from the network port, it sends the third frame with a size that is 60% of the FULL_SIZE. Again, the network exhausts the number of buffers at the network port and will hold off sending any more frames. When the port receives the content-block, it adds a descriptor entry into receive queue, decrements AVL_BUFF (to zero), and updates AVL_SPACE to be 1.0*FULL_SIZE. GOT_A_BUFFER again becomes TRUE, so the port signals that "1 more buffer is available", and increments AVL_BUFF.

When the network gets another buffer available signal from the network port, it sends the fourth frame with a size that is 40% of the FULL_SIZE. At this point, the port will not signal "1 more buffer is available", since there is not enough buffer space in both the buffers. When frames are processed and buffer space is freed (i.e. GOT_A_BUFFER becomes TRUE), then the port will signal the network that 1 or more buffer is available.

Dynamic compacting of content-blocks improves buffer utilization, by removing the one-to-one relationship between content-blocks and buffers. The foregoing allows the port to signal the network about available buffers once the port discovers that multiple content-blocks can fit in a FULL_SIZE buffer, and hence improve buffer utilization.

Figure 9B:
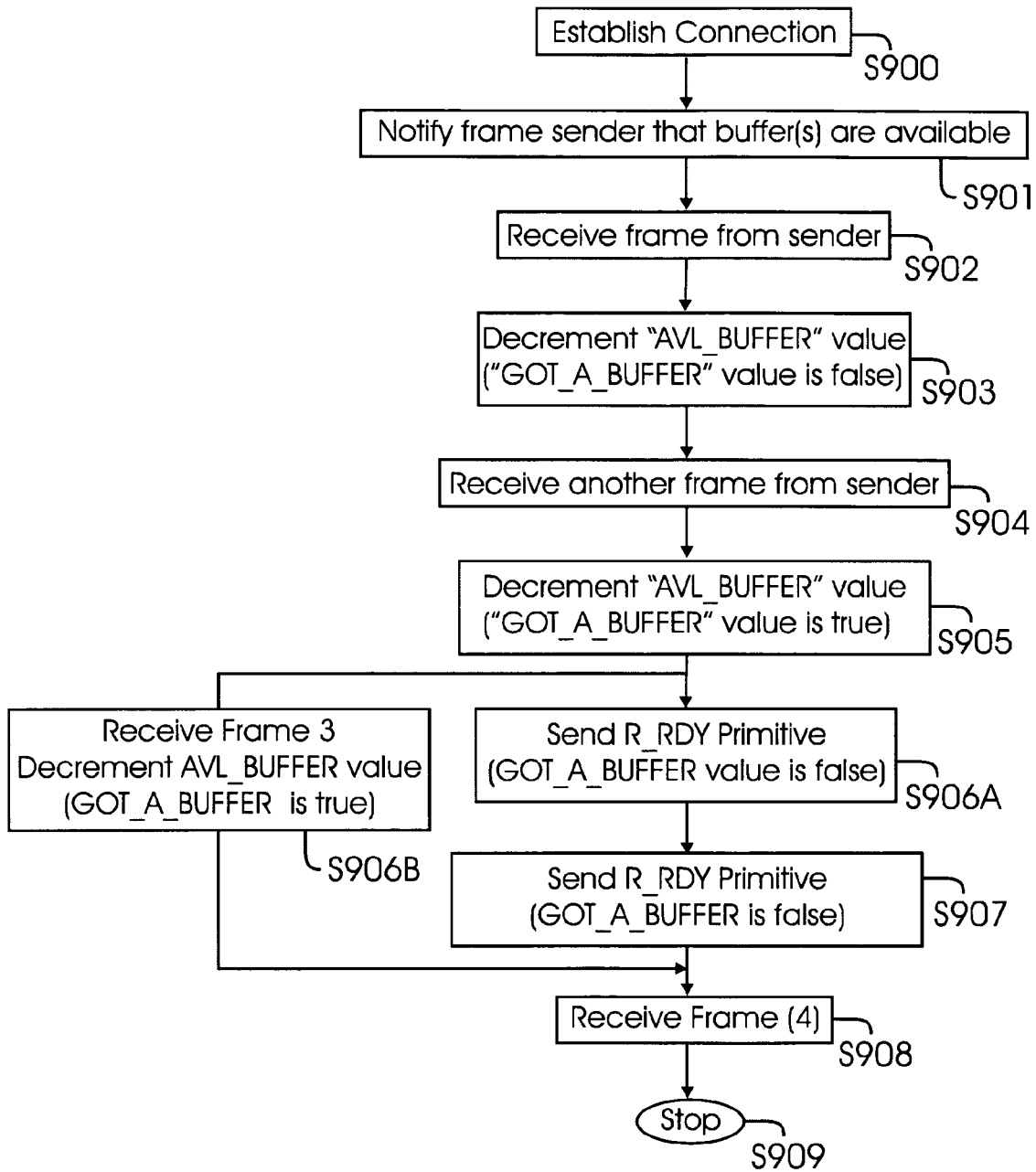
FIG. 9B shows a process flow diagram for managing buffers, according to one aspect of the present invention.

FIG. 9B is a process flow diagram illustrating the process steps for the foregoing example. In step S900, a network connection is made. In step S901, the source is notified that 2 FULL_SIZE receive buffers are available. In Fibre Channel, this notification is accomplished with 2 R_RDY primitives. In response to the notice, the source sends a frame in step S902.

In step S903, as discussed above, "AVL_BUFFER" value is decreased when Frame 1 is received. Because compacting did not yield an additional FULL_SIZE buffer, the "GOT_A_BUFFER" is false.

In step S904, a second (another) frame is received from the source and in step S905, the "AVL_BUFFER" value is decreased again. However, compacting in this step does yield an additional FULL_SIZE buffer, so the "GOT_A_BUFFER" value becomes true.

In step S906A, the R_RDY primitive is sent to the source, notifying the source that an additional FULL_SIZE receive buffer is available. When the R_RDY is sent, the "GOT_A_BUFFER" becomes false again.

In step S906B, the source receives the R_RDY and sends Frame 3. Frame 3 is received, and the "AVL_BUFFER" value is decreased. Because of compacting, another FULL_SIZE buffer is available, so the "GOT_A_BUFFER" is true.

In step S907, the R_RDY is sent, which causes the "GOT_A_BUFFER" to become false. Thereafter, the fourth frame is received in step S908 and the process is complete in step S909.

It is noteworthy that although the foregoing example involves four frames, the present invention is not limited to any particular number of frames that can be processed, according to the adaptive aspects of the present invention.

FIG. 5 shows a block diagram of the transmission protocol engine ("TPE") 407. TPE 407 maintains plural counters/registers to interact with drives coupled to ports 405. Each TPE 407 interacts with processor 400 via port manager interface 401.

Each Fibre Channel port of system 400A includes a TPE module for interfacing to with SerDes 406. TPE 407 handles most of the FC-1 layer (transmission protocol) functions, including 10B receive character alignment, 8B/10B encode/decode, 32-bit receive word synchronization, and elasticity buffer management for word re-timing and TX/RX frequency compensation.

SerDes modules 406 handle the FC-1 serialization and de-serialization functions. Each SerDes 406 port consists of an independent transmit and receive node.

TPE 407 has a receive module 500 (that operates in the Rx clock domain 503) and a transmit module 501. Data 502 is received from SERDES 406 and decoded by decoding module 504. A parity generator module 505 generates parity data. SGA interface 508 allows TPE to communicate with switch 514 or switch matrix 408. Interface 508 (via multiplexer 507) receives information from a receiver module 506 that receives decoded data from decode module 504 and parity data from module 505.

Management interfaces module 509 interfaces with processor 400. Transmit module 501 includes a parity checker 511, a transmitter 510 and an encoder 512 that encodes 8-bit data into 10-bit data. 10-bit transmit data is sent to SERDES 406 via multiplexer 513.

Figure 10:
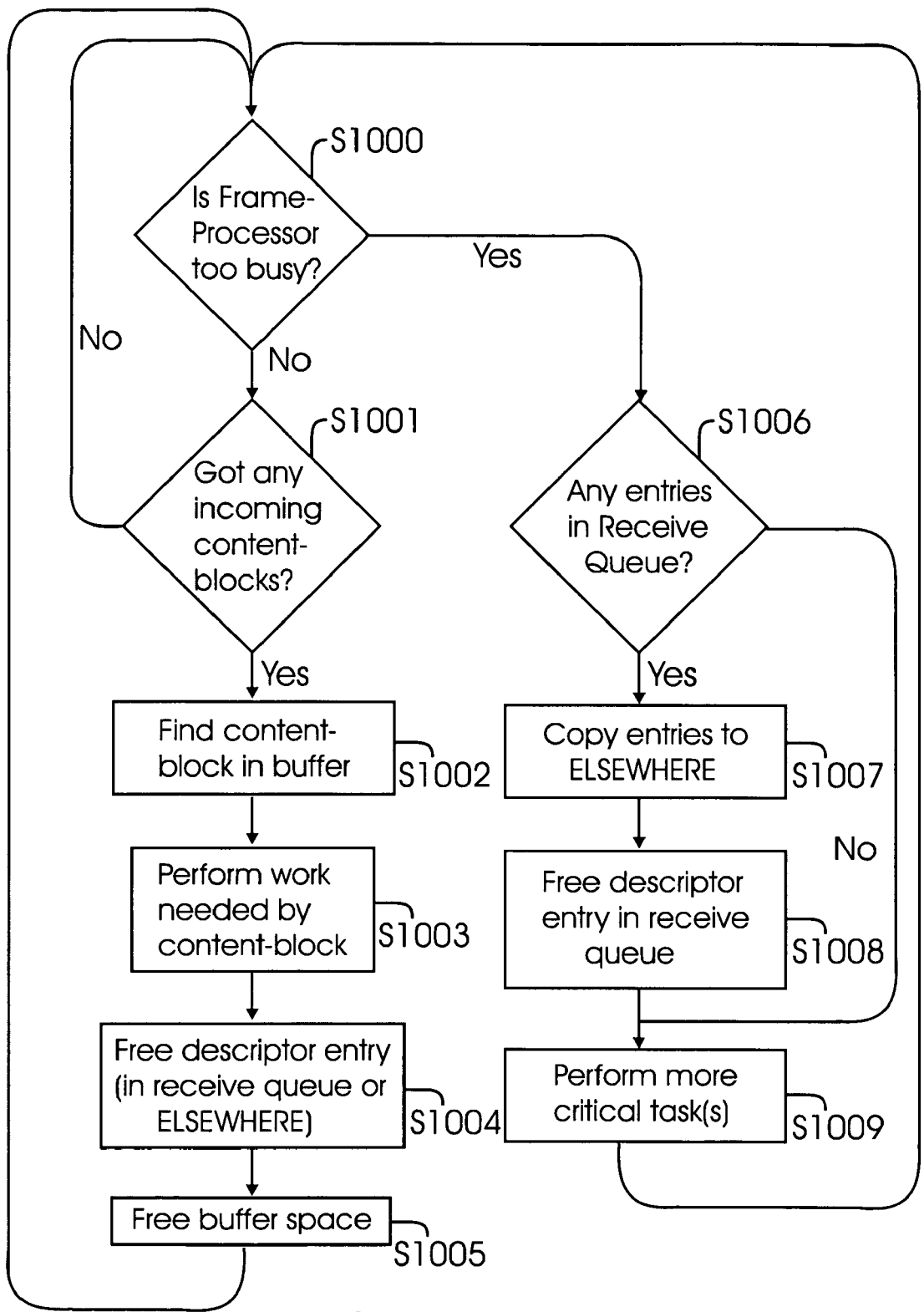
FIG. 10 shows a process flow diagram for managing a descriptor queue, according to one aspect of the present invention.

Dynamic Sizing of Receive Descriptor Queue:

FIG. 10 shows a flow diagram of executable process steps for dynamically sizing a receive descriptor queue, according to one aspect of the present invention. The process steps may be implemented by modules 402/403 or processor 400 or any other component (jointly referred to as the "Frame-Processor") that can manage a receive queue.

In step S1000, the process determines if the Frame processor is busy. If it is not busy, then in step S1001, the process determines if there are any incoming content blocks. If there are content blocks, then they are found in step S1002 and the work needed for the content blocks is performed in step S1003.

In step S1004, descriptor entry is freed and then buffer space is freed in step S1005. Thereafter, the process reverts back to step S1000.

If the Frame-processor is busy in step S1000 performing critical operations, then in step S1006, the process determines if there are any entries in the receive queue. If there are no entries, the process moves to step S1009.

If there are entries in the receive queue, then the entries are copied to another memory location (not shown) in step S1007. After copying the entry, in step S1008, the receive descriptor queue is free and the Frame-processor can perform other tasks in step S1009. Thereafter, the process reverts back to step S1000.

In one aspect of the present invention, by copying and then freeing the descriptor entries from the Receive Queue during timing-critical processing, the Frame-Processor can dynamically size the Receive Queue and maximize buffer utilization. The descriptor entries are copied to a secondary storage. If the Frame-Processor is a CPU running firmware, the descriptor entries may be copied to any memory that is accessible to a processor.

Although the present invention has been described with reference to specific embodiments, these embodiments are illustrative only and not limiting. For example, the foregoing system and process is not just limited to fibre channel networks and can be used in any network where fixed content blocks are used for data pacing. Many other applications and embodiments of the present invention will be apparent in light of this disclosure and the following claims.

What is claimed is:

1. A method for dynamically sizing a receive de-scriptor queue for a switch that is attached to a network, comprising:
    copying a receive descriptor queue entry from a first location to another location while a switch processor for the switch is performing another operation; wherein the receive descriptor queue stores descriptors that describe content blocks that are received from the network and content block size is non-negotiated and
    freeing the receive descriptor queue entry such that the switch processor can complete the other operation.

2. The method of claim 1, wherein the switch processor processes entries in the receive descriptor queue after the other operation is completed.

3. The method of claim 1, wherein a state machine in a network port of the switch monitors the receive descriptor queue.

4. A fibre channel switch element connected to a network, comprising:
    a port with a receive descriptor queue that stores descriptor information for content blocks with non-negotiated size and received from the network; wherein a receive descriptor queue entry is copied from a first location to another location while a switch processor of the switch element is performing another operation; and freeing the receive queue entry such that the switch processor can complete the other operation.

5. The switch element of claim 4, where the switch processor processes entries in the receive descriptor queue after the other operation is completed.

6. The method of claim 1, wherein the other operation that the switch processor is performing is timing critical.

7. The method of claim 1, wherein the switch receives content blocks from a Fibre Channel network that does not allow content block size negotiation.

8. The method of claim 1, further comprising:
    processing content blocks if the switch processor is not performing another operation; and
    clearing a buffer space after clearing a receive descriptor queue entry.

9. The switch element of claim 4, wherein a state machine in the port monitors the receive descriptor queue.

10. The switch element of claim 4, wherein the other operation is timing critical.

11. The switch element of claim 4, wherein the switch receives content blocks from a Fibre Channel network that does not allow content block size negotiation.

12. The switch element of claim 4, wherein content blocks are processed if the switch processor is not performing another operation; and a buffer space is cleared after clearing a receive descriptor queue entry.

* * * * *

UNITED STATES PATENT AND TRADEMARK OFFICE
CERTIFICATE OF CORRECTION

PATENT NO. : 7,152,132 B2  Page 1 of 1
APPLICATION NO. : 10/889588
DATED : December 19, 2006
INVENTOR(S) : Fike et al.

It is certified that error appears in the above-identified patent and that said Letters Patent is hereby corrected as shown below:

In column 5, line 51, delete "12C (12C" and insert -- I2C (I2C --, therefor.

In column 5, line 53, delete "12C" and insert -- I2C --, therefor.

In column 10, line 13, in Claim 1, delete "de-scriptor" and insert -- descriptor --, therefor.

Signed and Sealed this

Twenty-fifth Day of May, 2010

David J. Kappos
*Director of the United States Patent and Trademark Office*